US005910806A

United States Patent [19]

Narui et al.

[11] Patent Number: 5,910,806

[45] Date of Patent: *Jun. 8, 1999

[54] VIDEO DISPLAY APPARATUS

[75] Inventors: Yoshihisa Narui, Saitama; Motoki Ouchiyama, Tokyo; Yoko Yagi, Chiba, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/744,753

[22] Filed: Nov. 6, 1996

[30] Foreign Application Priority Data

Nov. 6, 1995 [JP] Japan .................................... 7-287548

[51] Int. Cl.[6] ...................................................... G06F 13/00

[52] U.S. Cl. .............................. 345/508; 345/11; 345/204

[58] Field of Search ............................ 345/132, 507–509, 345/10, 204, 11, 501, 511, 508, 502

[56] References Cited

U.S. PATENT DOCUMENTS

| | | | |
|---|---|---|---|
| 4,816,815 | 3/1989 | Yoshiba | 345/508 |
| 5,276,458 | 1/1994 | Sawdon | 345/132 |
| 5,602,567 | 2/1997 | Kanno | 345/132 |
| 5,675,364 | 10/1997 | Stedman et al. | 345/212 |
| 5,691,741 | 11/1997 | Kerigan et al. | 345/132 |
| 5,727,191 | 3/1998 | Konishi et al. | 345/132 |

FOREIGN PATENT DOCUMENTS

| | | | |
|---|---|---|---|
| 07168547 | 7/1995 | Japan | G09G 5/00 |

*Primary Examiner*—Kee M. Tung
*Attorney, Agent, or Firm*—Jay H. Maioli

[57] ABSTRACT

A video display apparatus capable of communicating with an external controller includes a microcontroller for receiving commands from an external controller, a first non-volatile memory for storing data relating to the video display apparatus, first bus line for connecting the external controller with the microcontroller and the first non-volatile memory, a second non-volatile memory for storing the same data that is stored in the first non-volatile memory, and second bus lines for connecting the second non-volatile memory with the microcontroller.

9 Claims, 7 Drawing Sheets

VIDEO DISPLAY APPARATUS

BACKGROUND OF THE INVENTION

The present invention relates to a video display apparatus and in particular to a video display apparatus that uses a display data channel (DDC) system to communicate device specific information to an external controller.

The American Video Electronics Standard Association (VESA) proposed the DDC Standard. Under the DDC standard a computer system having a computer connected with peripheral equipment such as a monitor, a keyboard, a mouse, and so on may exchange device specific data among the computer and the peripheral equipment through bus lines in accordance with a predetermined protocol.

The DDC system defines several levels. DDC1 mode accomodates unidirectional communication. DDC2 mode allows bidirectional communication. The DDC2 mode is further classified into two levels. DDC2B mode only allows reading of DDC data from peripheral equipment by the computer. DDC2AB mode allows reading and writing DDC data between the computer and the peripheral equipment. The DDC2AB system is also referred to as an ACCESS bus.

Device specific information, such as the device model or serial number, as well as operational information, such as the settings for the vertical and horizontal screen sizes, are stored as DDC data. DDC data is typically stored in a region of non-volatile memory within the display device. DDC data can be accessed by an external controller.

FIG. 1 shows a possible arrangment of a video display device 6 that utilizes a DDC system. DDC data 21 is stored in non-volitile memory 2. DDC data 21 is accesible by a microcomputer 1 via the DDC buses 14*a*, 14*b*. An external controller 5 accesses DDC information from the microcomputer 1 through a communications bus 15. A second DDC external controller 4 can access the DDC non-volatile memory 2 via the DDC buses 14*a*, 14*b*.

In a system where the DDC data 21 resides only in the DDC non-volatile memory, several difficulties may be encountered that prevent rapid access of DDC data 21 by an external controller 4. For example, since the DDC bus is connected not only to the video display apparatus 6 and the external controller 4 but may also be connected to a mouse or the like, when communication between the mouse and the external controller 4 occupies the DDC bus, the microcomputer 1 cannot gain access to the bus 14. Therefore, communication cannot be carried out between the microcomputer 1 and the DDC non-volatile memory 2.

Additionally, if the microcomputer 1 reads out the DDC data 21 from the non-volatile memory 2 after receiving a command from the external controller 4 requesting the microcomputer 1 to send the DDC data, there will be a delay before the microcomputer 1 can transmit DDC data to the external controller 4. An error will occur if this delay exceeds the time allowed for a reply in the DDC2AB mode.

Also, if the portion of the DDC non-volatile memory 2 holding DDC data is damaged, then the DDC data must be rewritten to a new portion of DDC non-volatile memory 2'. The data must be written in the non-volatile memory 2' from the DDC external controller 4 through the DDC buses 14*a*, 14*b*. If the DDC data includes data specific to the video display apparatus, for example, its serial number, then the DDC external controller 4 must be given this information before it can rewrite DDC data to the undamaged DDC non-volatile memory 2'.

Since the DDC non-volatile memory 2 is connected to a bus that is accessible outside the video display apparatus 6, the DDC data 21 stored in the non-volatile memory 2 may be corrupted.

SUMMARY OF THE INVENTION

In view of these problems, it is an object of the present invention to provide a video display apparatus that can transmit correct DDC data to external devices in accordance with a DDC2AB command received while its microcomputer cannot communicate with its DDC non-volatile memory and that, even when the DDC non-volatile memory is damaged, allows the DDC data specific to the video display apparatus to be written to a new portion of the non-volatile memory.

According to an aspect of the present invention, a video display apparatus capable of communicating with an external controller includes a microcontroller for receiving commands from the external controller, a first non-volatile memory for storing data to the video display apparatus, a first bus line for connecting the external controller with the microcontroller and the first non-volatile memory for communicating the same data as that stored in the first non-volatile memory, a second non-volatile memory, and a second bus line for connecting the second non-volatile memory with the microcontroller.

DESCRIPTION OF THE PREFERRED EMBODIMENT

According to the present invention, a video display apparatus utilizes a display data channel (DDC) system in which its DDC non-volatile memory communicates with external devices independent of its CPU in the DDC1 and DDC2B modes and through its CPU in the DDC2AB mode. The video display apparatus has the DDC non-volatile memory and a second non-volatile memory connected with the CPU through an internal bus. Both of the non-volatile memories are used for storing DDC data.

Figure 1:
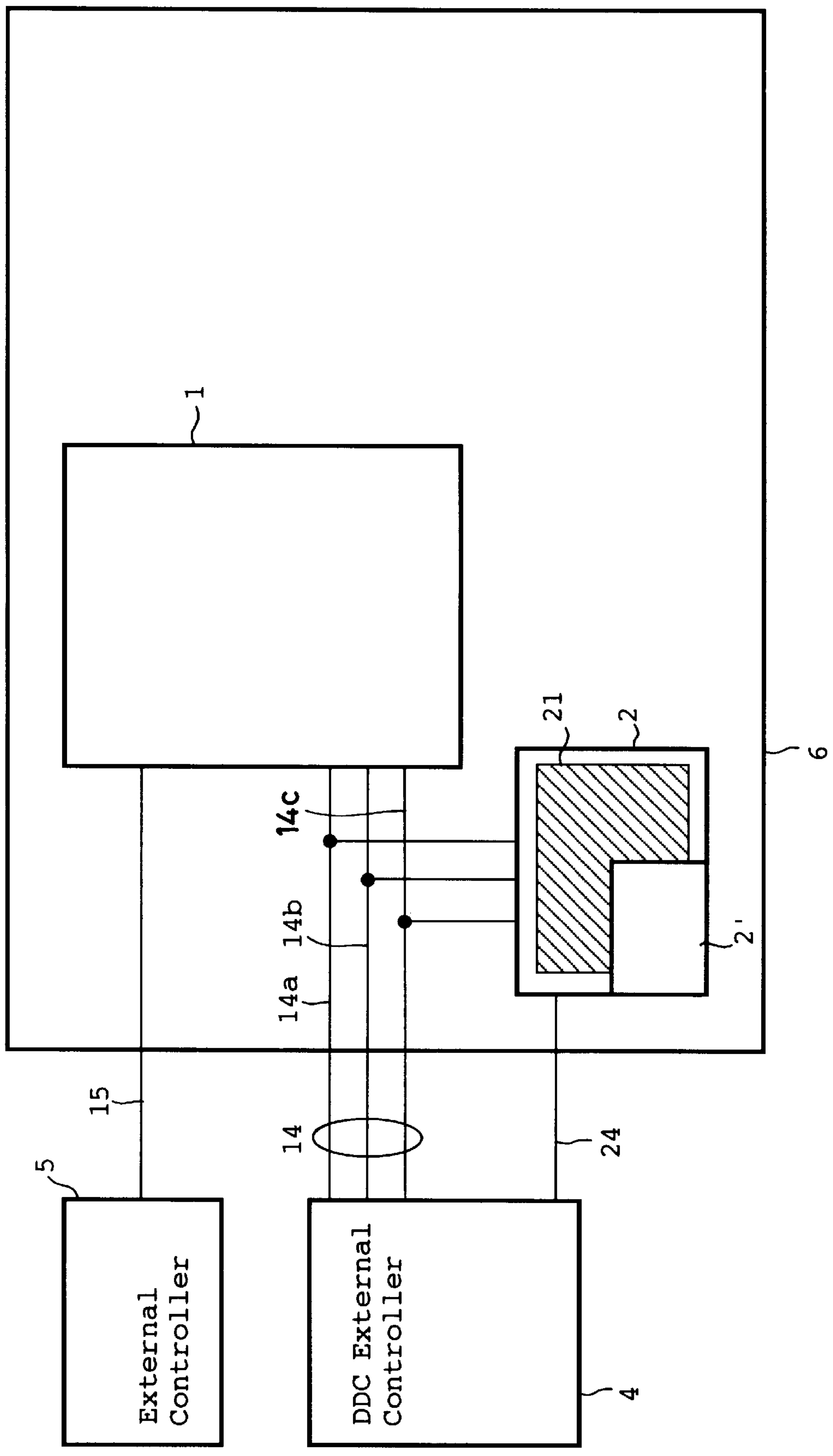
FIG. 1 is a diagram showing a previously proposed arrangement of a video display apparatus and external controllers.
Figure 2:
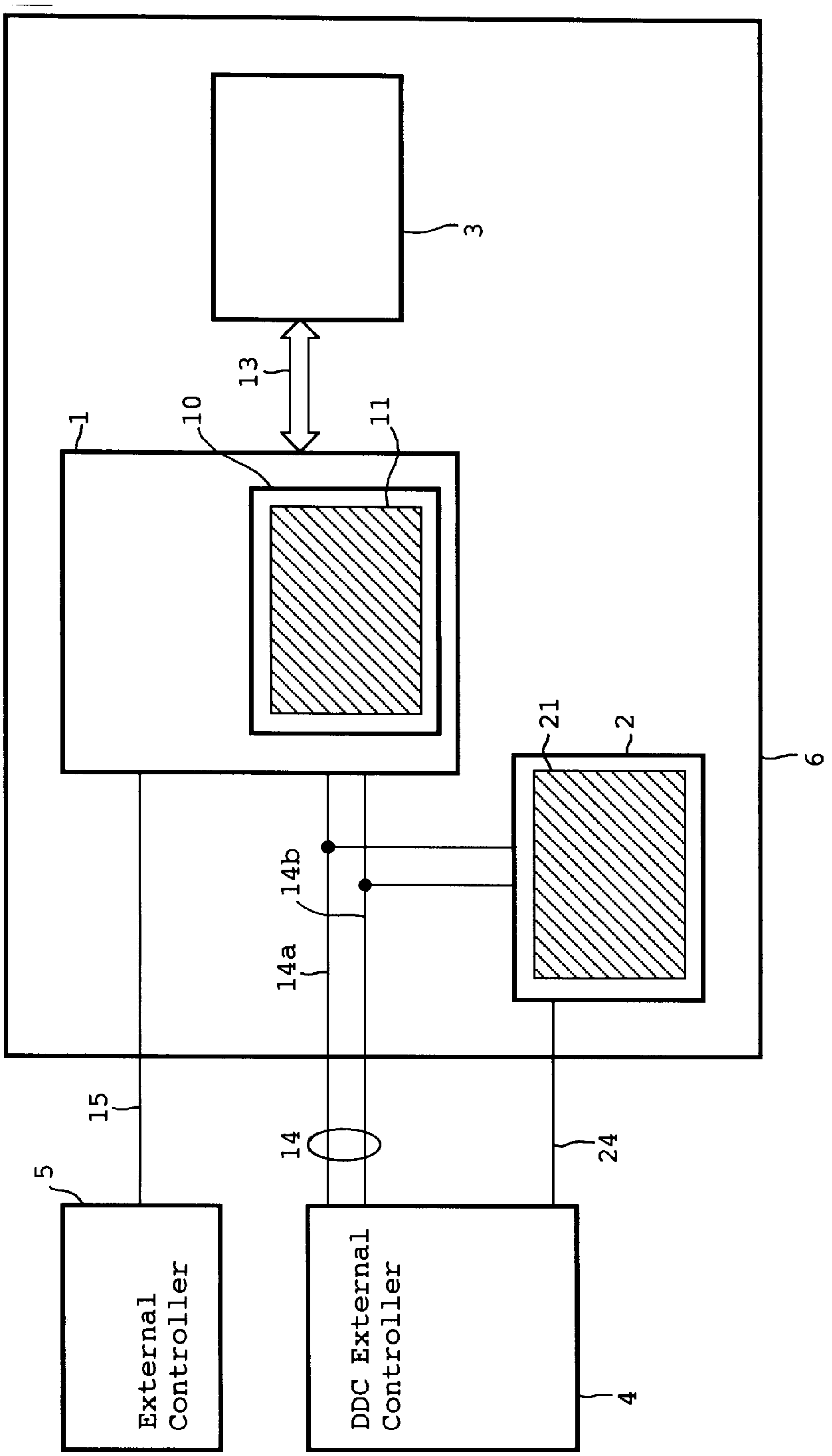
FIG. 2 is a diagram showing an arrangement of a video display apparatus according to a first embodiment of the present invention.

FIG. 2 is a diagram of a first embodiment of the present invention. As shown in FIG. 2, a video display apparatus 6 includes a microcomputer 1 formed of one chip, a non-volatile memory 2 dedicated to the DDC system (DDC non-volatile memory 2), and a second non-volatile memory 3 capable of communicating with the microcomputer 1 through an internal bus 13.

The microcomputer 1, the DDC non-volatile memory 2 and the DDC external controller 4 are connected to one another through IIC buses 14*a*, 14*b*. The portion of this bus outside the video display apparatus 6 itself are referred to as a DDC bus 14. The DDC non-volatile memory 2 and the DDC external controller 4 are also connected to each other through a clock line 24 that is used in the DDC1 mode.

In this embodiment, the non-volatile memory 2 and RAM 10 provided in the microcomputer 1 store the DDC data 11 and 21 shown by the hatched portions in FIG. 2. The DDC data may include extended display identification (EDID) data, which consists of a 128-byte data segment indicating device specific information. If the device is a monitor, for example, information such as its product ID number, its display power management system (DPMS), color tables or the like may be contained in the EDID. The DDC data may also include adjustment values of the video display apparatus 6 such as contrast, brightness, vertical and horizontal sizes (V. Size and H.Size) of the picture, or the like. The DDC data is usually stored in the DDC non-volatile memory 2.

In DDC1 and DDC2B modes where data is only read from the peripheral device, the DDC data 21 can be transmitted from the DDC non-volatile memory 2 to the external controller 4 directly, that is, not through the microcomputer 1. In DDC2AB mode, the microcomputer 1 must mediate the transfer of DDC data.

In the DDC2AB mode, each time the microcomputer 1 is energized, the microcomputer 1 reads out the DDC data 21 from the DDC non-volatile memory 2 and writes it in the RAM 10 as the DDC data 11. When a DDC2AB command is received from the external controller 4, the microcomputer 1 reads out the DDC data 11 from the RAM 10 and transmits it to the external controller 4. Moreover, in the DDC2AB mode, the data stored in the non-volatile memory 2 can also be rewritten back to the non-volatile memory 2 by using the external controller 5. DDC data stored in RAM 10 can be accessed by the external controller 5 regardless of whether the DDC bus 14*a*, 14*b* is occupied by other devices, for example, a mouse.

Figure 3:
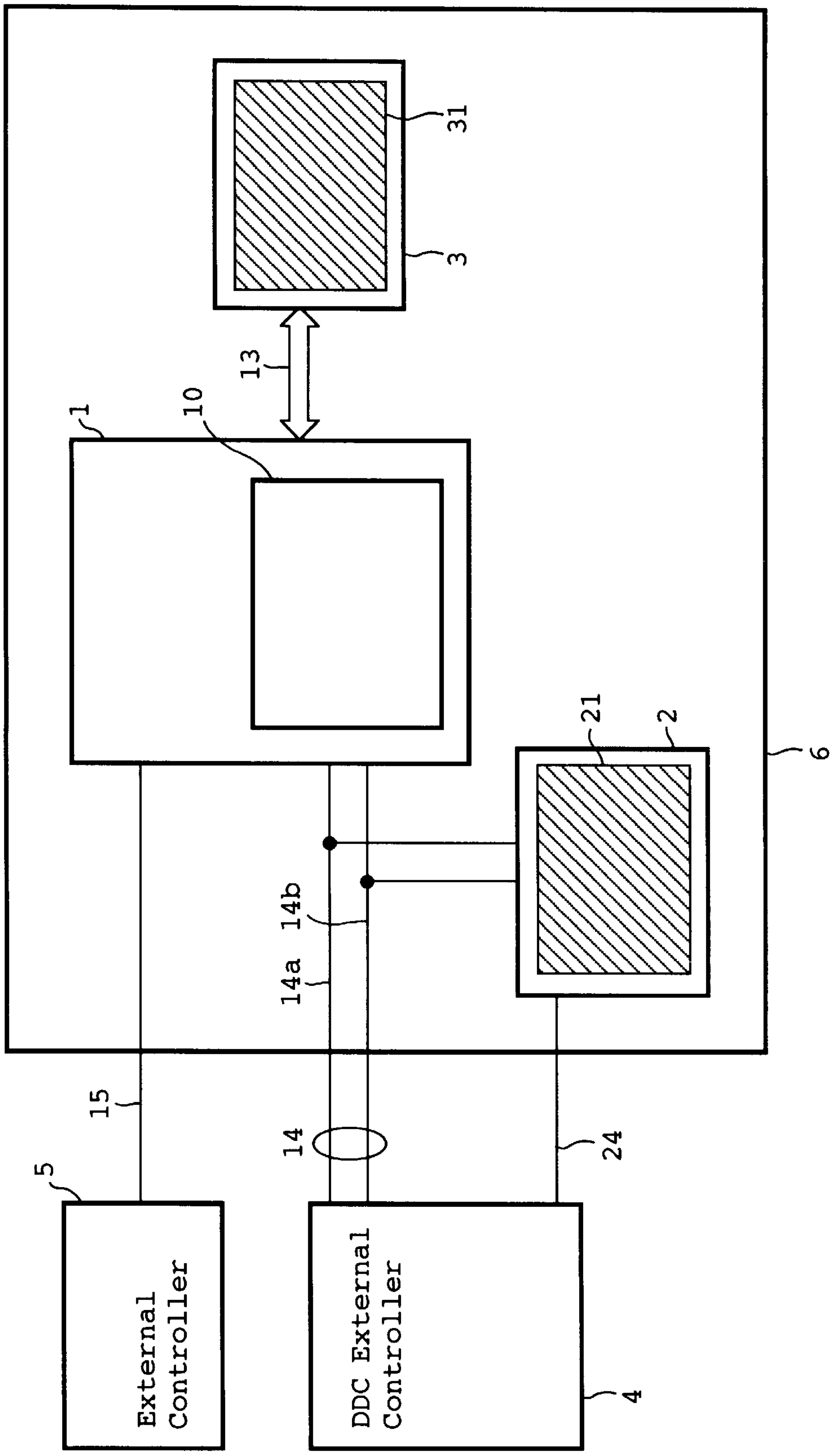
FIG. 3 is a diagram showing an arrangement of a video display apparatus according to a second embodiment of the present invention.

A video display apparatus according to a second embodiment of the present invention will hereinafter be described with reference to the accompanying drawings. FIG. 3 is a block diagram showing an arrangement of a video display apparatus utilizing the DDC system to which the present invention is applied. Similar structures corresponding to those shown in FIG. 2 are marked with the same reference numerals. These have been described above and need not be described in detail again.

As shown in FIG. 3, identical DDC data (hatched portions shown in FIG. 3) are stored in both the DDC non-volatile memory 2 and the non-volatile memory 3 connected with the microcomputer 1 through the internal bus 13. Therefore, in the DDC1 and DDC2B modes mentioned above, it is possible to transmit DDC data 21 from the DDC non-volatile memory 2 directly to an external device in a manner similar to the arrangement shown in FIG. 2.

In the DDC2AB mode, however, in response to a command from the external controller 4, the microcomputer 1 will read out DDC data 31 from the non-volatile memory 3 connected therewith through the internal bus 13 and output the DDC data 31 to the external controller 4.

If the DDC data 21 stored in the DDC non-volatile memory 2 is also stored as the DDC data 31 in the non-volatile memory 3 connected with the microcomputer 1 through the internal bus 13 during manufacture, then the microcomputer 1 can transmit correct DDC data 31 in the DDC2AB mode without communication between the microcomputer 1 and the DDC non-volatile memory 2.

The DDC data can also be written in/read out from the non-volatile memory 3 connected with the microcomputer 1 through the internal bus 13 by transmitting a command from the external controller 5 according to the RS232C protocol.

Therefore, the video display apparatus 6 can be instructed to store the same DDC data in both the DDC non-volatile memory 2 and in the non-volatile memory 3. The microcomputer 1 can then access DDC data through the internal bus 13. According to the present invention, even when the microcomputer 1 and the DDC non-volatile memory 2 cannot communicate with each other, or when the DDC bus 14 is occupied, the microcomputer 1 can still transmit the correct DDC data 31 in the DDC2AB mode.

Figure 4:
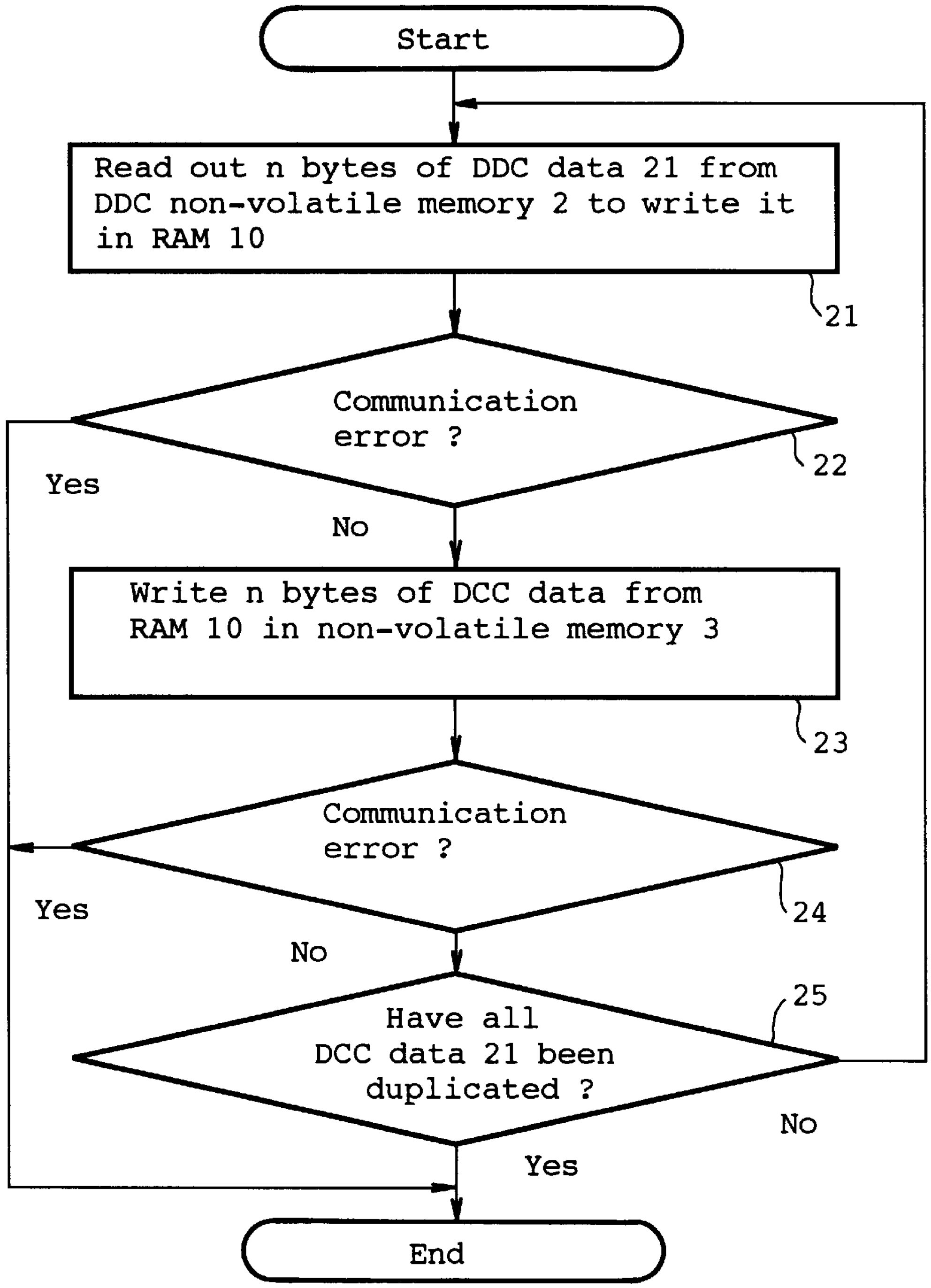
FIG. 4 is a flowchart used to explain operation of the video display apparatus shown in FIG. 3.
Figure 5:
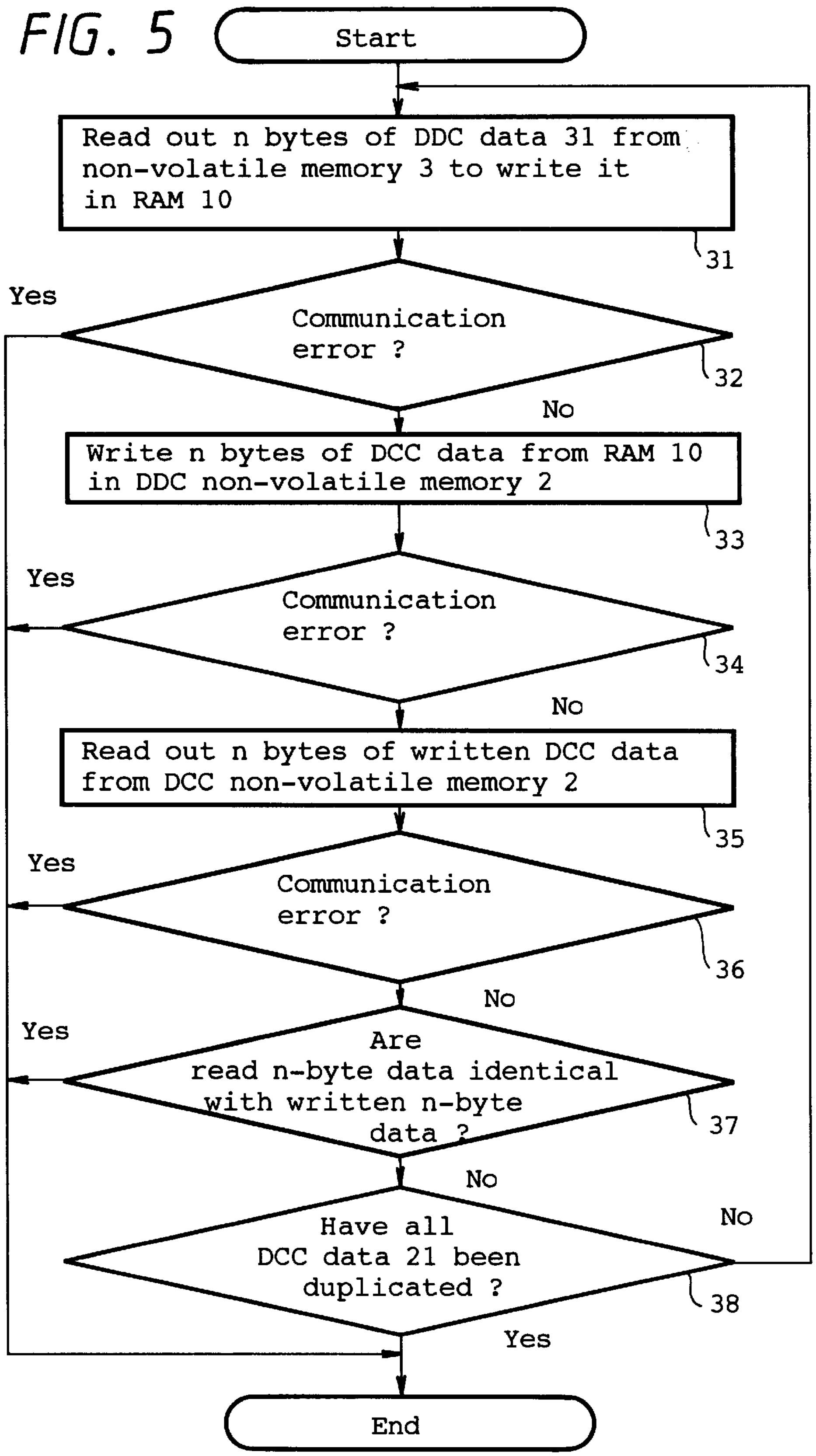
FIG. 5 is a flowchart used to explain operation of the video display apparatus shown in FIG. 3.

FIG. 4 is a flowchart of a method for duplicating the DDC data 21 stored in the DDC non-volatile memory 2 to the non-volatile memory 3 by the microcomputer 1 through the internal bus 13. FIG. 5 is a flowchart of a method for duplicating the DDC data 31 stored in the non-volatile memory 3 by the microcomputer 1 through the internal bus 13 to the DDC non-volatile memory 2.

As shown in the flowchart of the FIG. 4, in step 21 the microcomputer 1 reads out n bytes of the DDC data 21 from the DDC non-volatile memory 2 and writes this data to its RAM 10. Then, the processing proceeds to step 22, wherein it is determined whether a communication error has occurred. If it is determined in step 22 that a communication error has occurred (as represented by Yes), then processing ends.

If it is determined in step 22 that no communication error has occurred (as represented by No), then the processing proceeds to step 23, wherein n bytes of the DDC data is read out from the RAM 10 and written as the DDC data 31 in the non-volatile memory 3 by the microcomputer 1 through the internal bus 13. Then, the processing proceeds to step 24, wherein it is determined whether a communication error has occurred. If it is determined in step 24 that a communication error has occurred (as represented by Yes), then processing ends.

If it is determined in step 24 that there is no communication error (as represented by No), then the processing proceeds to step 25, wherein it is determined whether all the DDC data 21 has been duplicated. If it is determined in step 25 that all the DDC data 21 has not been duplicated (as represented by No), then the processing returns to step 21. If it is determined in step 25 that all the DDC data 21 has been duplicated (as represented by Yes), then the processing ends.

In summary, in the process shown in FIG. 4, the microcomputer 1 reads out DDC data 21 from the DDC non-volatile memory 2 in n-byte length segments, and writes the n-byte length data segments to the non-volatile memory 3 connected through the internal bus 13, via the RAM 10. This processing is repeated until all the DDC data 21 is duplicated. Thus, the microcomputer 1 duplicates the DDC data 21 stored in the DDC non-volatile memory 2 as DDC data 31 in the non-volatile memory 3 through the internal bus 13.

FIG. 5 is a flowchart of a method for duplicating the DDC data 31 stored in the non-volatile memory 3 and storing it in the non-volatile memory 2. As shown in FIG. 5, in step 31 the microcomputer 1 reads out n bytes of the DDC data 31 stored in the non-volatile memory 3 through the internal bus 13 and writes the n-byte data segment in the RAM 10. Then, the processing proceeds to step 32, wherein it is determined whether a communication error has occurred. If it is determined in step 32 that a communication error has occurred (as represented by Yes), then processing ends.

If it is determined in step 32 that there has been no communication error (as represented by No), then the processing proceeds to step 33, wherein n bytes of the DDC data is read out from the RAM 10 and written in the DDC non-volatile memory 2. Then, the processing proceeds to step 34, wherein it is determined whether a communication error has occured. If it is determined in step 34 that a communication error has occurred (as represented by Yes), then processing ends.

If it is determined in step 34 that there has been no communication error (as represented by No), then the processing proceeds to step 35, wherein the microcomputer 1 reads out the n bytes of the DDC data 31 from the DDC non-volatile memory 2. Then, the processing proceeds to step 36, wherein it is determined whether a communication error has occured. If it is determined in step 36 that a communication error has occurred (as represented by Yes), then processing ends.

If, on the other hand, it is determined in step 36 that there has been no communication error (as represented by No), then processing proceeds to step 37, wherein it is determined whether the n-byte data read out in step 35 is identical to the data written in step 33. If it is determined in step 37 that both of the data are not identical (as represented by No), then processing ends.

If it is determined in step 37 that both of the data are identical (as represented by Yes), then the processing proceeds to step 38, wherein it is determined whether all the DDC data 31 have been duplicated. If it is determined in step 38 that all the DDC data 31 have not been duplicated (as represented by No), then the processing returns to step 31. If it is determined in step 38 that all the DDC data 31 have been duplicated (as represented by Yes), then processing ends.

In summary, in the process shown in FIG. 5, the microcomputer 1 reads out the DDC data 31 stored in the non-volatile memory 3 through the internal bus 13 in n-byte segments and writes the n-byte segments to the DDC non-volatile memory 2 via the RAM 10. The microcomputer 1 compares the data written in the DDC non-volatile memory 2 with the data read out therefrom after the writing. If both of the data are identical, then the microcomputer 1 determines that the data was written to the DDC non-volatile memory 2 successfully. This process is repeated until all the DDC data 31 have been duplicated. Thus, the microcomputer 1 duplicates the DDC data 31 stored in the non-volatile memory 3 as DDC data 21 in the DDC non-volatile memory 2.

Figure 6:
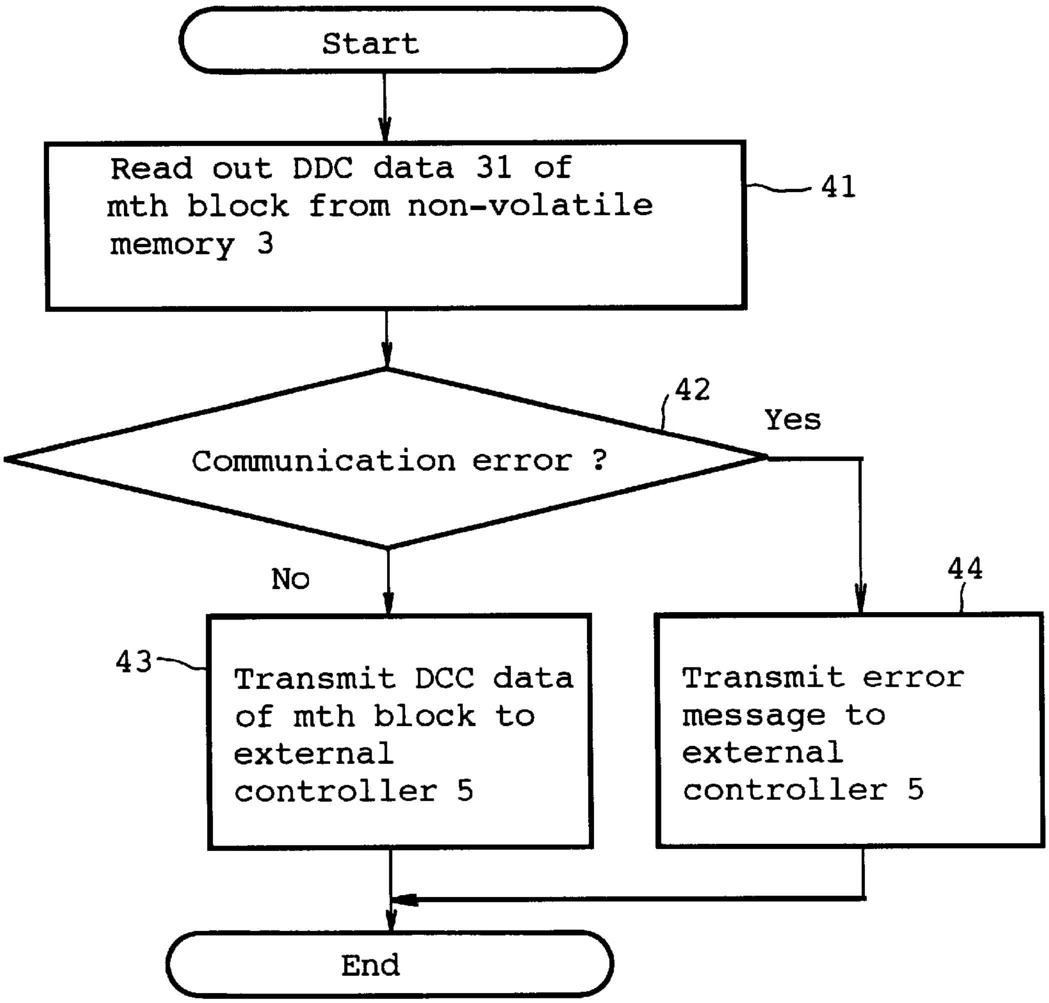
FIG. 6 is a flowchart used to explain operation of the video display apparatus shown in FIG. 3.
Figure 7:
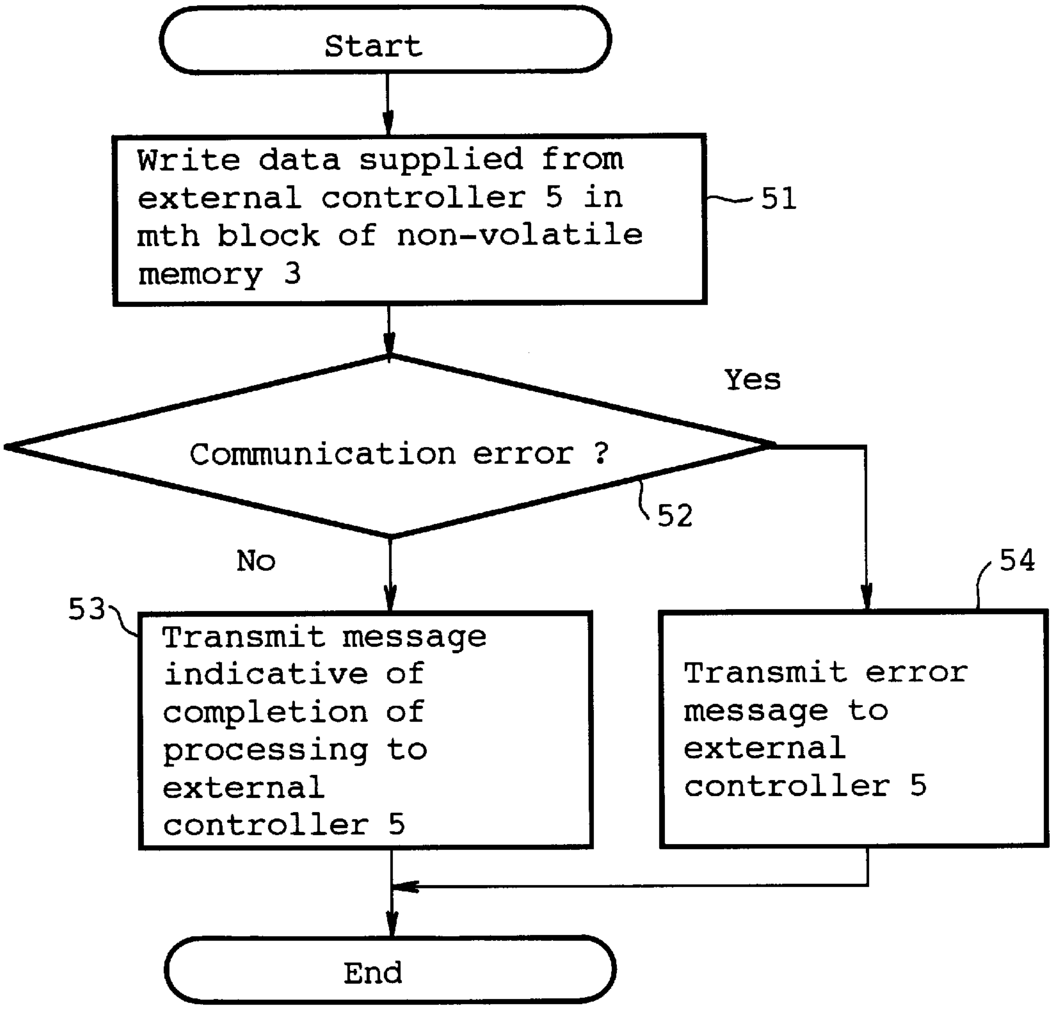
FIG. 7 is a flowchart used to explain operation of the video display apparatus shown in FIG. 3.

FIG. 6 is a flowchart used to explain a method for reading out the DDC data 31 from the non-volatile memory 3 in response to a command from the external controller 5 to transmit the DDC data 31 to the external controller 5. FIG. 7 is a flowchart used to explain a method for writing the DDC data supplied from the external controller 5 to the non-volatile memory 3.

In these flowcharts, it is assumed that the DDC data is divided into blocks and the DDC data of the mth block is read and written in response to a command from the external controller 5. Specifically, the DDC data is read out from and written to a designated address in the non-volatile memory 3 connected with the microcomputer 1 through the internal bus 13. The microcomputer 1 then transmits a value corresponding to successful transmission of the mth data block or an error message if data was not transmitted successfully to the external controller 5.

In the flowchart of FIG. 6, in step 41, the microcomputer 1 reads out an mth block of DDC data 31 from the non-volatile memory 3 through the internal bus 13. Then, the processing proceeds to step 42, wherein it is determined whether a communication error has occurred. If it is determined in step 42 that there has been no communication error (as represented by No), then the processing proceeds to 43, wherein the microcomputer 1 transmits the mth block of DDC data to the external controller 5. Then, the processing ends.

If on the other hand it is determined in step 42 that communication error has occurred (as represented by Yes), then the processing proceeds to step 44, wherein the microcomputer 1 transmits a message indicating the occurrence of a communication error to the external controller 5. Then, processing ends. Thus, in response to a command from the external controller 5, the microcomputer 1 reads out the DDC data 31 from the non-volatile memory 3 and transmits it to the external controller 5.

In the flowchart of FIG. 7, in step 51, the microcomputer 1 rewrites the mth block of DDC data supplied from the external controller 5 to the non-volatile memory 3. Then, the processing proceeds to step 52, wherein it is determined whether a communication error has occurred. If it is determined in step 52 that there has been no communication error (as represented by No), then the processing proceeds to step 53, wherein the microcomputer 1 transmits a message indicating the completion of writing to the external controller 5. Then, processing ends.

If on the other hand it is determined in step 52 that a communication error has occurred (as represented by Yes), then the processing proceeds to step 54, wherein the microcomputer 1 transmits an error message indicating a transmission error to the external controller 5. Then, processing ends. Thus, the microcomputer 1 writes the DDC data supplied from the external controller 5 to the non-volatile memory 3 through the internal bus 13 as the DDC data 31.

The present invention is not limited to the above embodiments. The duplication of the DDC data may also be accomplished, not through communication with the external controller 5, but through communication with the DDC external controller 4.

As described above, according to the present invention, since the same DDC data as that stored in the DDC non-volatile memory 2 is stored in the non-volatile memory 3 connected with the microcomputer 1 through the internal bus 13 in the video display apparatus, the following advantages can be achieved.

It is possible for the microcomputer 1 to transmit the uncorrupted DDC data to an external device in response to a DDC2AB command, even when the microcomputer 1 cannot communicate with the DDC non-volatile memory 2.

If either of the non-volatile memories 2, 3 becomes inoperative, the DDC data stored in the other functional non-volatile memory can be substituted. Therefore, in the event that one of the non-volitile memories 2, 3 became non-functional, as long as the other non-volatile memory is operable, the external controller 5 can copy DDC data directly from the video display device. It is not neccesary that the DDC external controller 4 restore DDC data before the external controller 5 has access to DDC data.

Having described a preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A video display apparatus for communicating with first and second external controllers, wherein at least two communication modes exist between said video display apparatus and said first and second external controllers, said video display apparatus comprising:

microcontroller means for receiving commands from said first and second external controllers;

first non-volatile memory means for storing data relating to said video display apparatus;

first bus line means for connecting said first external controller with said microcontroller means and said first non-volatile memory means;

backup second non-volatile memory means for storing a same data relating to said video display apparatus as that stored in said first non-volatile memory means; and internal bus line means for connecting said backup second non-volatile memory means with said microcontroller means, wherein said data stored in said backup second non-volatile memory means is read by one of said first and second external controllers by way of said microcontroller in a backup mode of said at least two communication modes, and said data stored in said first non-volatile memory means is read directly by said first external controller in a second mode of said at least two communication modes.

2. A video display apparatus according to claim 1, wherein said data stored in said first non-volatile memory means is read out directly by said first external controller in said second mode of said at least two communication modes and is read through said microcontroller means in a third mode of said at least two communication modes.

3. A video display apparatus according to claim 2, wherein said microcontroller means comprises a random access memory in which said data stored in said first non-volatile memory means and said backup second non-volatile memory means is written.

4. A video display apparatus according to claim 1, wherein said microcontroller means reads out said data stored in said first non-volatile memory means and writes said data in said backup second non-volatile memory means.

5. A video display apparatus according to claim 1, wherein said microcontroller means reads out said data stored in said backup second non-volatile memory means and writes said data in said first non-volatile memory means.

6. A video display apparatus according to claim 1, wherein said data stored in first non-volatile memory means is display data channel (DDC) data.

7. A video display apparatus according to claim 6, wherein said video display apparatus is a monitor.

8. A video display apparatus according to claim 7, wherein said data is indicative of a function of said monitor.

9. A video display apparatus according to claim 7, wherein said data is adjustment data of said monitor.

* * * * *